United States Patent
Cho et al.

(10) Patent No.: US 7,228,454 B2
(45) Date of Patent: Jun. 5, 2007

(54) METHOD AND APPARATUS OF PROCESSING DATA ACCORDING TO DATA TYPES

(75) Inventors: Sung-youn Cho, Seoul (KR); Seung-youl Jeong, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 454 days.

(21) Appl. No.: 10/790,782

(22) Filed: Mar. 3, 2004

(65) Prior Publication Data

US 2004/0205389 A1    Oct. 14, 2004

(30) Foreign Application Priority Data

Mar. 19, 2003   (KR) ............... 10-2003-0017064

(51) Int. Cl.
G06F 11/00   (2006.01)

(52) U.S. Cl. .............. 714/13; 714/1; 714/774; 725/131; 725/134; 725/139; 725/142; 725/151

(58) Field of Classification Search ........... 714/1, 714/774; 725/131, 134, 139, 142, 151
See application file for complete search history.

(56) References Cited

U.S. PATENT DOCUMENTS

| | | | |
|---|---|---|---|
| 6,400,728 B1 * | 6/2002 | Ott ....................... | 370/465 |
| 6,654,901 B1 * | 11/2003 | Nakai et al. ............ | 714/1 |
| 2001/0052130 A1 * | 12/2001 | Yap et al. ............... | 725/90 |

FOREIGN PATENT DOCUMENTS

KR   2002-90223   11/2002

* cited by examiner

Primary Examiner—Robert W. Beausoliel, Jr.
Assistant Examiner—Charles Ehne
(74) Attorney, Agent, or Firm—Staas & Halsey LLP (57) ABSTRACT

A method of and apparatus for processing data according to data types. The data processing method is performed by a slave processor and a main processor, wherein the slave processor stores and reads data and the main processor is connected to the slave processor to process the data. The data processing method includes: the main processor, transmitting at least one reference address to the slave processor, analyzing whether transmission data to be communicated to the slave processor is data that has to be processed in real-time or data that does not have to be processed in real-time, setting a relative address of the transmission data according to the analyzed result, and transmitting the relative address to the slave processor, wherein the relative address is an address of the slave processor in which the transmission data to be transmitted to the slave processor is to be stored or an address of the slave processor in which the transmission data to be received from the slave processor is stored, and the slave processor storing the transmitted reference address, determining whether the transmission data is data that has to be processed in real-time or data that does not have to be processed in real-time by comparing the relative address with the reference address, and correcting errors generated when the transmission data is processed, using predetermined processes according to the determined result. Therefore, it is possible to improve error-correction performance, utilize the slave processor for various purposes, and reduce an access time of the main processor.

26 Claims, 8 Drawing Sheets

METHOD AND APPARATUS OF PROCESSING DATA ACCORDING TO DATA TYPES

CROSS-REFERENCE TO RELATED APPLICATIONS

This application claims the benefit of Korean Patent Application No. 2003-17064, filed on Mar. 19, 2003, in the Korean Intellectual Property Office, the disclosure of which is incorporated herein in its entirety by reference.

BACKGROUND OF THE INVENTION

1. Field of the Invention

The present invention relates to a device such as a personal video recorder (PVR), a digital video recorder (DVR), a set top box (STB) and/or a similar device, which uses audio-visual (AV) data together with non-AV data, or general data, and more particularly, to a method of and apparatus for processing data being used by the device according to data type.

2. Description of the Related Art

Hereinafter, a conventional data processing method used by host computers and hard disk drives (HDDs) will be described.

In a conventional data processing method, a host computer transmits a command to a hard disk drive. The hard disk drive determines if an error is generated while processing data according to the command. If no error is generated, the hard disk drive receives or transmits data from/to the host computer, according to the command from the host computer. However, if an error is generated, the hard disk drive attempts to correct the error regardless of the type of data to be subjected to error-correction. In a case where the error is not completely corrected, the hard disk drive informs the host computer of the existence of the error.

The conventional data processing method attempts to correct data as completely as possible regardless of the type of data. Even if the data to be subjected to error-correction in the hard disk drive is not general data, but audio-visual (AV) data, the conventional data processing method attempts to correct the error in the AV data. Since AV data has to be processed in real-time (for example, in AV data the number of frames to be processed per second is fixed), correcting the errors in a predetermined time is important. A problem exists in the conventional data processing method that corrects data errors uniformly regardless of data type. Such a method cannot efficiently process AV data and/or other time dependent data.

SUMMARY OF THE INVENTION

The present invention provides a data processing method, capable of processing error-correction according to the type of data to be processed.

The present invention also provides a data processing apparatus, which is capable of differently processing error-correction according to the type of data to be processed.

Additional aspects and/or advantages of the invention will be set forth in part in the description which follows and, in part, will be obvious from the description, or may be learned by practice of the invention.

According to an aspect of the present invention, there is a method of processing data according to data type. The method utilizes a slave processor and a main processor, wherein the slave processor stores and reads type 1 data that has to be processed in real-time and type 2 data that does not have to be processed in real-time. The main processor is connected to the slave processor to process the type 1 data and/or the type 2 data. The data processing method includes: the main processor storing and/or transmitting at least one reference address to the slave processor, analyzing whether the transmission data to be communicated to the slave processor is type 1 data or the type 2 data, setting a relative address according to the analyzed result, and transmitting the relative address to the slave processor, wherein the relative address is an address of the slave processor in which the transmission data to be transmitted to the slave processor is to be stored or an address of the slave processor in which the transmission data to be received from the slave processor is stored. The method further includes the slave processor storing the transmitted reference address, determining whether the transmission data is the first data or the second data by comparing the relative address with the reference address, and correcting errors that may be generated when the transmission data is processed, using processes differently predetermined according to the determined result.

According to another aspect of the present invention, there is an apparatus for processing data according to data type having: a slave processor which receives and/or stores at least one reference address, receives a relative address, determines whether transmission data is type 1 data or type 2 data by comparing the relative address with the reference address, corrects errors that may be generated when the transmission data is processed, using processes differently predetermined according to the determined result, and stores and/or reads the type 1 and the type 2 data. The apparatus also has a main processor which transmits and/or stores at least one reference address to the slave processor, analyzes whether the transmission data to be communicated with the slave processor is type 1 data or type 2 data type, sets the relative address according to the analyzed result, transmits the set relative address to the slave processor, wherein the relative address is either an address of the slave processor in which the transmission data is to be stored or an address of the slave processor in which the transmission address to be received from the slave processor is stored, and processes the type 1 data and/or the type 2 data, wherein the type 1 data is data that has to be processed in real-time and the type 2 data is data that does not have to be processed in real-time.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
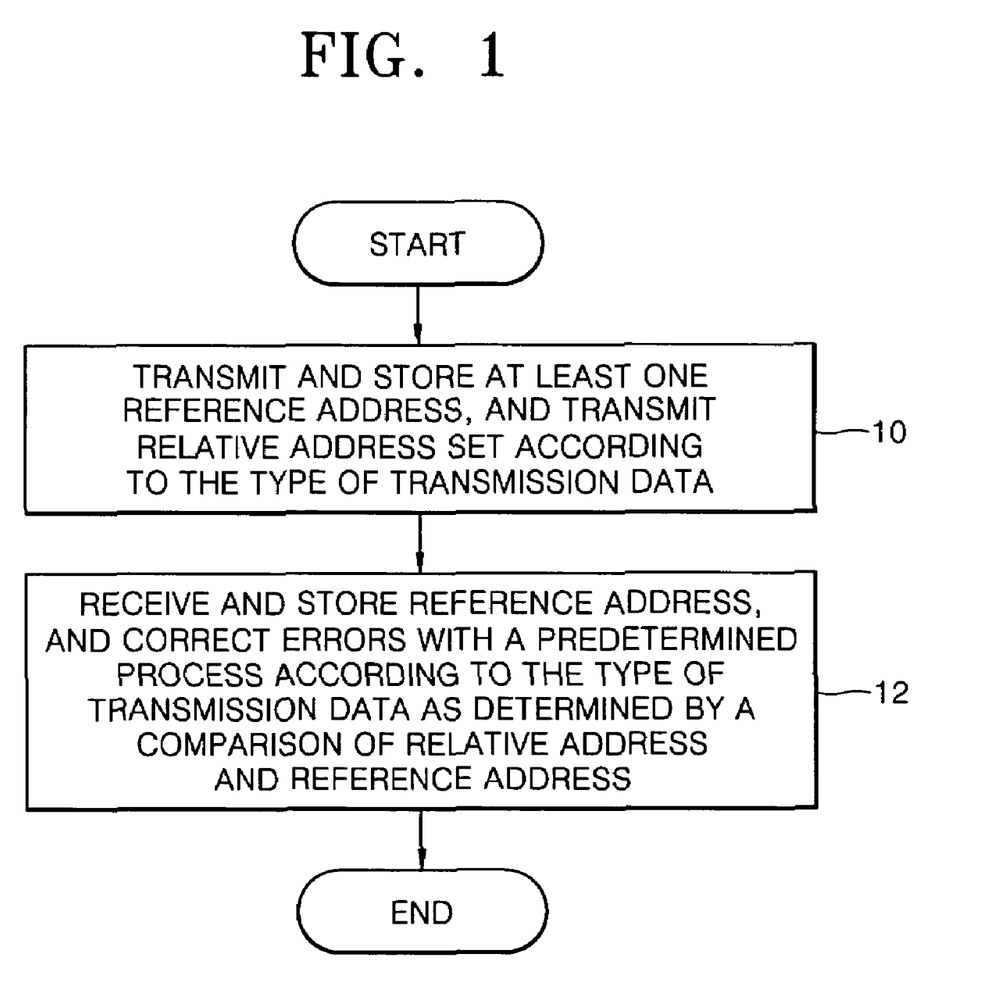
FIG. 1 is a flow chart illustrating a data processing method according to the present invention.

FIG. 1 is a flow chart illustrating a data processing method according to the present invention, wherein the data processing method consists of transmitting at least one reference address and relative address operation 10 and correcting errors using a predetermined processes according to data types operation 12.

The data processing method according to an aspect of the present invention is performed by a main processor (not shown) and a slave processor (not shown). Here, the slave processor stores and/or reads type 1 data that have to be processed in real-time and type 2 data that does not have to be processed in real-time. The main processor is connected with the slave processor and acts to process the type 1 and/or the type 2 data. Here, the type 1 data is data that should be processed in real-time even if errors are present in the processed data. Such data may be audio data, such as MP3, or audio-visual data, such as Moving Picture Expert Group (MPEG). Also, the type 2 data is data that should not include errors even if not being processed in real-time. The type 2 data needs to be accurate.

In the data processing method illustrated in FIG. 1, the main processor transmits and stores at least one reference address to the slave processor, analyzes whether the transmission data, data to be communicated with the slave processor, is type 1 data or type 2 data, sets a relative address of the transmission data according to the analyzed result, and transmits the relative address to the slave processor (10). The relative address is an address of the slave processor in which the transmission data to be transmitted to the slave processor is to be stored, or an address of the slave processor in which the transmission data to be received from the slave processor is stored. Operation 10 is performed by the main processor. According to the present invention, the at least one reference address set by a user (or developer) of the main processor can be changed. Here, the relative address may be a logical block address (LBA). An LBA is not a physical address of the slave processor, but an imaginary address of the slave processor which can be recognized by the main processor and the slave processor. The slave processor can match the LBA to an actual physical address.

Figure 2:
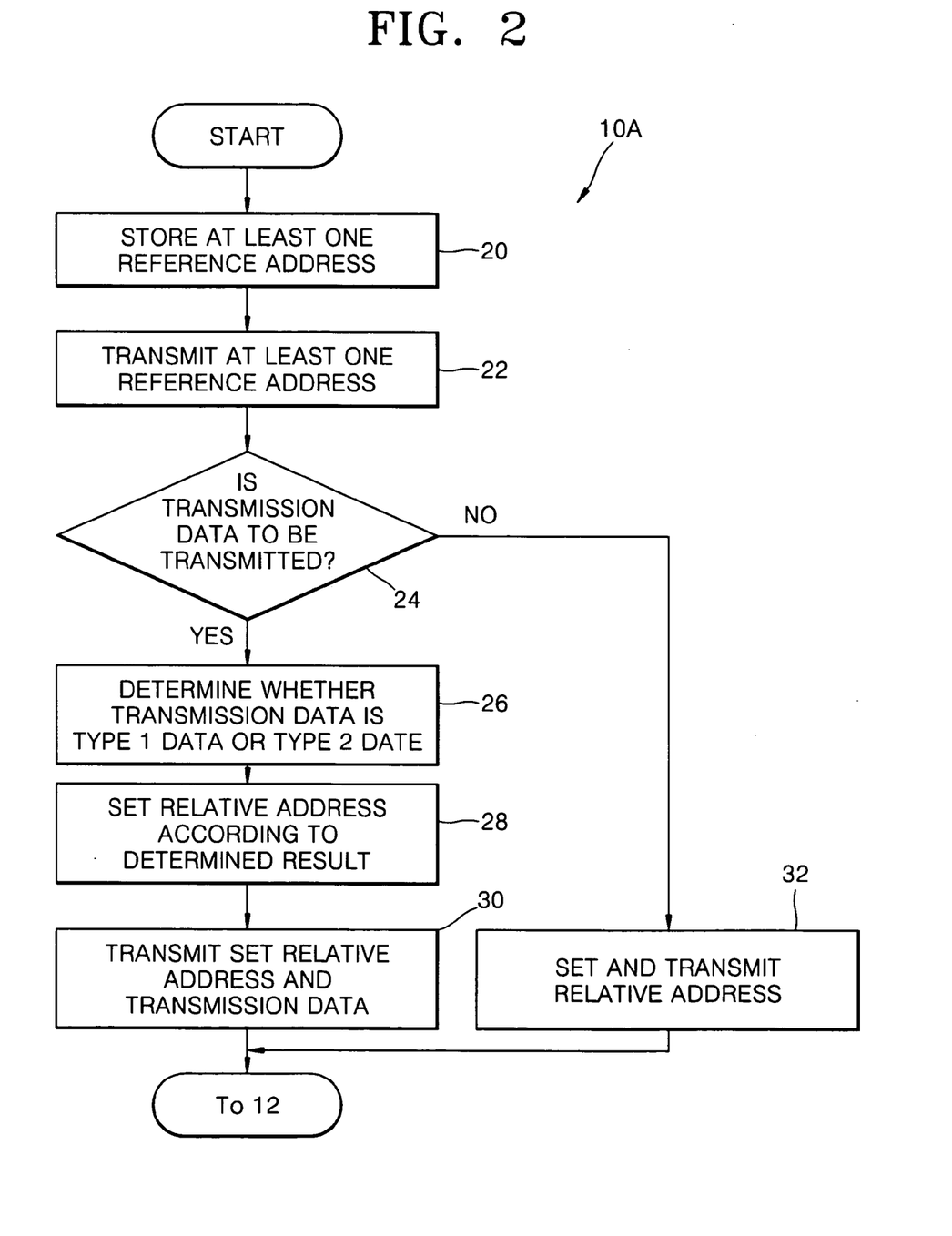
FIG. 2 is a flow chart illustrating an embodiment of operation 10 shown in FIG. 1, according to the present invention.

FIG. 2 is a flow chart illustrating an embodiment 10A of operation 10 shown in FIG. 1, according to the present invention. Operation 10A comprises storing and transmitting at least one reference address (operations 20 and 22), and separately generating and transmitting a relative address according to whether transmission data is to be transmitted to the slave processor or received from the slave processor (operations 24 through 32).

Initially, the main processor stores at least one reference address set by a user operation 20. After operation 20, the main processor transmits the at least one reference address to the slave processor operation 22. Although FIG. 2 shows 20 and 22 performed sequentially, this is not necessary, 20 and 22 can be performed simultaneously, or operation 22 can be performed prior to operation 20.

After operation 22, the main processor determines whether transmission data is to be transmitted to the slave processor or received from the slave processor (operation 24).

If the transmission data is to be transmitted to the slave processor, the main processor determines whether the transmission data to be transmitted to the slave processor is type 1 data or type 2 data (operation 26) and sets a relative address according to the determined result (operation 28). For example, if transmission data is to be transmitted to the slave processor, the main processor analyzes the header of the transmission data and determines whether the transmission data is type 1 data or type 2 data, by the results of the analysis (operation 26). After operation 26, the main processor sets a relative address of the transmission address to be stored in the slave processor, according to the determined result (operation 28).

After operation 28, the main processor transmits the set relative address and the transmission data to the slave processor (operation 30). However, if transmission data is to be received from the slave processor in 24, the main processor sets and transmits to the slave processor a relative address of the slave processor in which the transmission data to be received from the slave processor is stored (operation 32). After the relative address and transmission data are transmitted in operation 30 or the relative address is transmitted in operation 32, FIG. 1 operation 12 is performed.

Following operation 10, the slave processor stores at least one reference address received from the main processor, compares the relative address of the transmission data with the reference address or addresses, determines whether the transmission data is type 1 data or type 2 data, and corrects errors that may have been generated during the processing of the transmission data, using separate predetermined processes according to the type or types of data (operation 12). For example, when the slave processor receives and/or writes transmission data from the main processor, errors may be generated. Also, when the slave processor reads the transmission data errors may be generated.

Figure 3:
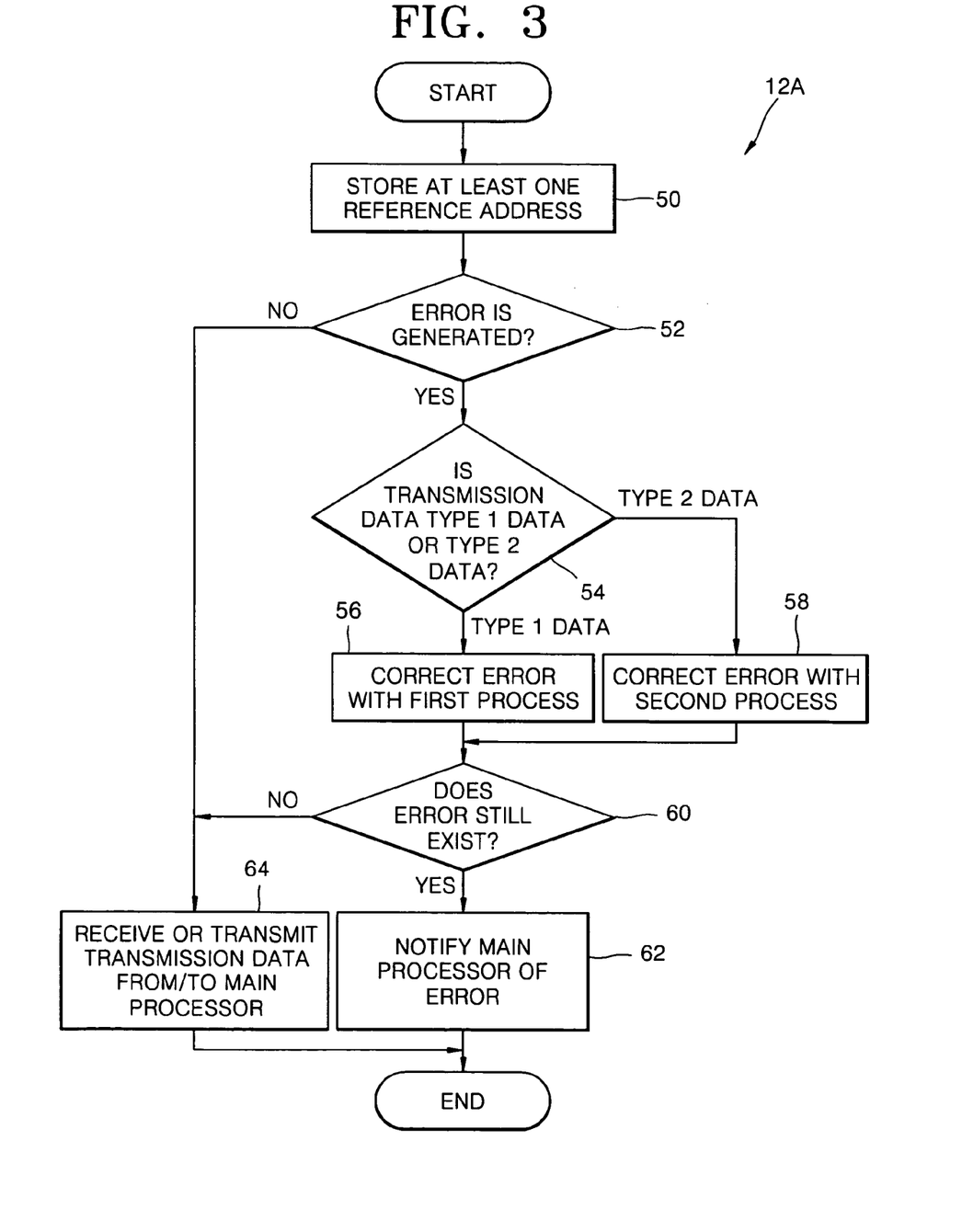
FIG. 3 is a flow chart illustrating an embodiment of operation 12 shown in FIG. 1, according to the present invention.

FIG. 3 is a flow chart for describing an alternate embodiment 12A of FIG. 1 operation 12, according to an aspect of the present invention, wherein the embodiment 12A comprises storing at least one reference address (operation 50), detecting an error (operation 52) and correcting an error using separate predetermined processes according to the type of data (type 1 and/or type 2) being transmitted when the error is generated (operations 54 through 64).

Following operation 10, the slave processor stores the at least one reference address received from the main processor (operation 50). When the slave processor receives the relative address from the main processor, the slave processor determines if any errors have been generated (operation 52).

If an error is generated, the slave processor compares the relative address with the reference address and/or addresses and determines whether the transmission data is type 1 data or type 2 data (operation 54). If the transmission data is type 1 data, the slave processor corrects the error using a first process (operation 56). However, if the transmission data is type 2 data, the slave processor corrects the error using a second process (operation 58).

According to an aspect of the present invention, the main processor sets a relative address value larger than the reference address value if the transmission data is type 1 data, and sets the relative address value smaller than the reference address value if the transmission data is type 2 data. If an error is generated, the slave processor determines whether the relative address value received from the main processor is larger than the reference address value (operation 54). If the relative address value is larger than the reference address value, that is the transmission data is type 1 data, the slave processor corrects the error using the first process (operation 56). On the other hand, if the relative address value is smaller than the reference address value, that is the transmission data is type 2 data, the slave processor corrects the error using the second process (operation 58).

According to an alternate aspect of the present invention, the main processor sets the relative address value smaller than a reference address value if the transmission data is type 1 data, and sets the relative address value larger than the reference address value if the transmission data is type 2 data. Here, if an error is generated, the slave processor determines whether the relative address value received from the main processor is smaller than the reference address value (operation 54). If the relative address value is smaller than the reference address value, that is the transmission data is type 1 data, the slave processor corrects the error using the first process (operation 56). On the other hand, if the relative address value is larger than the reference address value, that is the transmission data is type 2 data, the slave processor corrects the error using the second process (operation 58).

Meanwhile, if no errors are generated, the slave processor receives or transmits the transmission data from/to the main processor (operation 64).

Following operations 56 or 58, the slave processor determines if any errors are present in the error-corrected result (operation 60). If no errors exist in the error-corrected result, the slave processor receives or transmits the transmission data from/to the main processor (operation 64). For example, if an error is generated when the slave processor attempts to receive the transmission data from the main processor, the slave processor receives the transmission data from the main processor after the error is corrected. Also, if an error is generated when the slave processor attempts to transmit the transmission data to the main processor, the slave processor transmits the transmission data to the main processor after the error is corrected.

If errors exist in the error-corrected result, the slave processor notifies the main processor that the generated errors are not corrected (operation 62). Operation 12A shown in FIG. 3 can omit operations 60 and 62, differently from FIG. 3. In this case, after operation 56, after operation 58, or, if no error is generated, the slave processor receives or transmits the transmission data from/to the main processor (operation 64).

Figure 4:
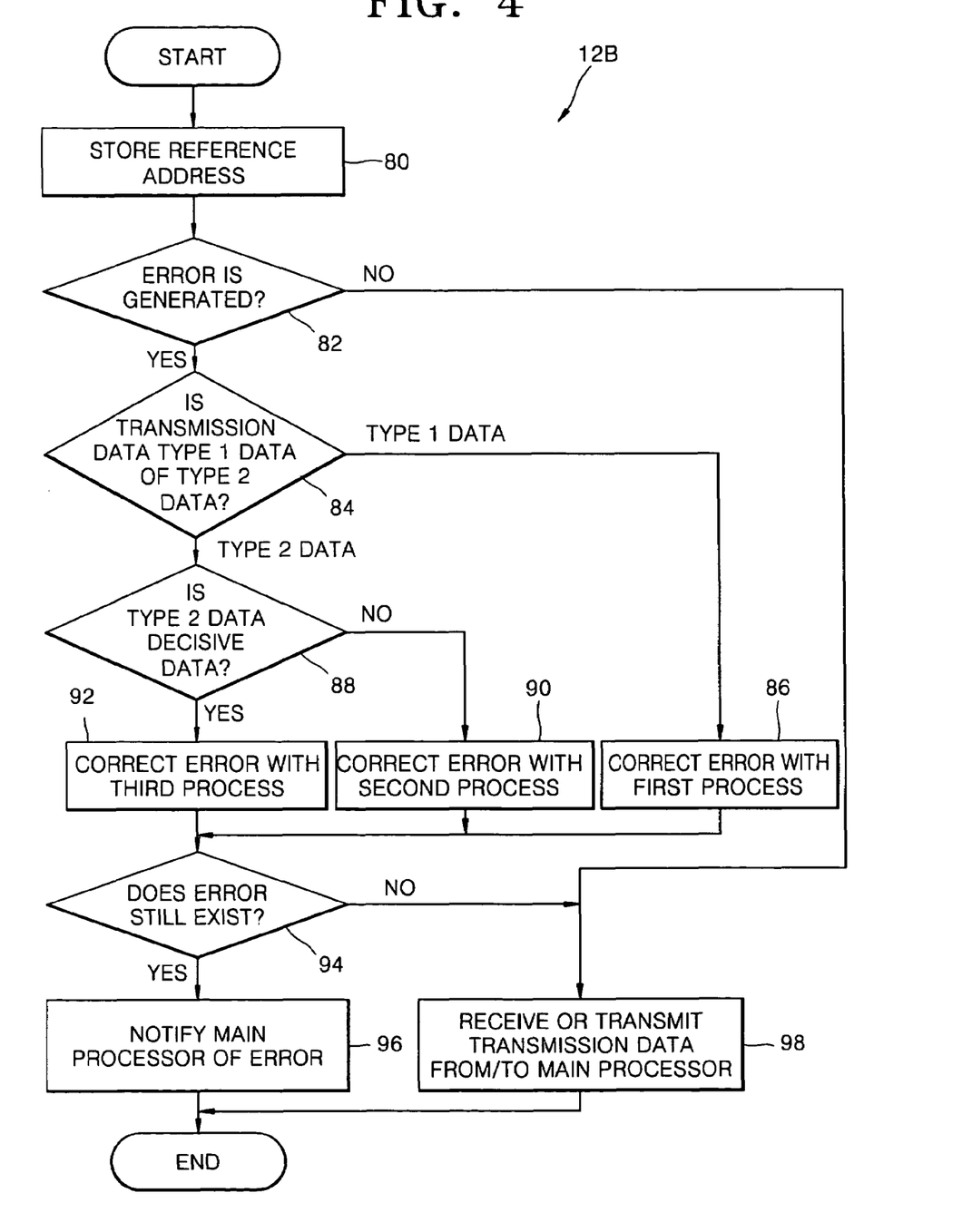
FIG. 4 is a flow chart illustrating an alternate embodiment of operation 12 shown in FIG. 1, according to the present invention.

FIG. 4 is a flow chart describing an alternate embodiment 12B of FIG. 1, operation 12 according to an aspect of the present invention. Operation 12B comprises storing at least one reference address (operation 80), and correcting errors using different processes according to the type of data (type 1, type 2 decisive, and/or non-decisive, being transmitted when the error is generated (operations 82 through 98).

Operations 80, 82, 84, 86, 94, 96 and 98 of the embodiment 12B shown in FIG. 4 correspond to operations 50, 52, 54, 56, 60, 62 and 64 of the embodiment 12A shown in FIG. 3, respectively, and perform similar operations. Accordingly, descriptions for operations 80, 82, 84, 94, 96 and 98 will be omitted.

Following 84, if the transmission data is type 2 data, the slave processor determines whether the type 2 data is non-decisive data or decisive data (operation 88). Here, decisive data means important data (for example, log data) which does not have to be processed in real-time but which should not include errors, and non-decisive data means relatively less important data than decisive data, which does not have to be processed in real-time.

During operations 84 and 88, the main processor sets a relative address using a first reference address of one among the reference addresses if the transmission data is type 1 data. The main processor sets a relative address using a second reference address of the other one among the reference addresses if the transmission data is type 2 data. If an error is generated, the slave processor compares the relative address with the first reference address and determines whether the transmission data is type 1 data or type 2 data (operation 84). If the transmission data is type 2 data, the slave processor compares the relative address with the second reference address and determines whether the type 2 data is non-decisive data or decisive data (operation 88).

In one aspect of the present invention, there is a first reference address and a second reference address, where the first reference address is larger than the second reference address. Here, the main processor sets the relative address value larger than the first reference address value if the transmission data is type 1 data, and the main processor sets the relative address value smaller than the first reference address value if the transmission data is type 2 data. Furthermore, the main processor sets the relative address value larger than the second reference address value when the type 2 data is the decisive data, and the main processor sets the relative address value smaller than the second reference address value when the type 2 data is non-decisive data. In this case, the slave processor recognizes the transmission data as type 1 data if the relative address value is larger than the first reference address value, and recognizes the transmission data as type 2 data if the relative address value is smaller than the first reference address value. The slave processor then compares the relative address with the second reference address and determines that the type 2 data is decisive data if the relative address value is greater than the second reference address value, and that the type 2 data is non-decisive data if the relative address value is less than the second reference address value.

Alternately, there is a first reference address and a second reference address, where the first reference address is smaller than the second reference address. Here the main processor sets the relative address value smaller than the first reference address value if the transmission data is type 1 data, and sets the relative address value greater than the first reference address value if the transmission data is type 2 data. Also, the main processor sets the relative address value smaller than a second reference address value if the type 2 data is the decisive data larger than the second reference address value if the type 2 data is non-decisive data. In this case, the slave processor recognizes the transmission data as type 1 data if the relative address value is smaller than the first reference address value, and recognizes the transmission data as the type 2 data if the relative address value is larger than the first reference address value. The slave processor then compares the relative address to the first reference address to determine if the type 2 data is decisive or non-decisive data.

If the type 2 data is the non-decisive data, the slave processor corrects the error using the second process (operation 90). On the other hand, if the type 2 data is the decisive data, the slave processor corrects the error using a third process, wherein the third process is different from the second process (operation 92).

Hereinafter, various embodiments of a data processing apparatus having a slave processor and a main processor and methods of data processing, according to the present invention, will be described in detail with reference to the appended drawings.

Figure 5:
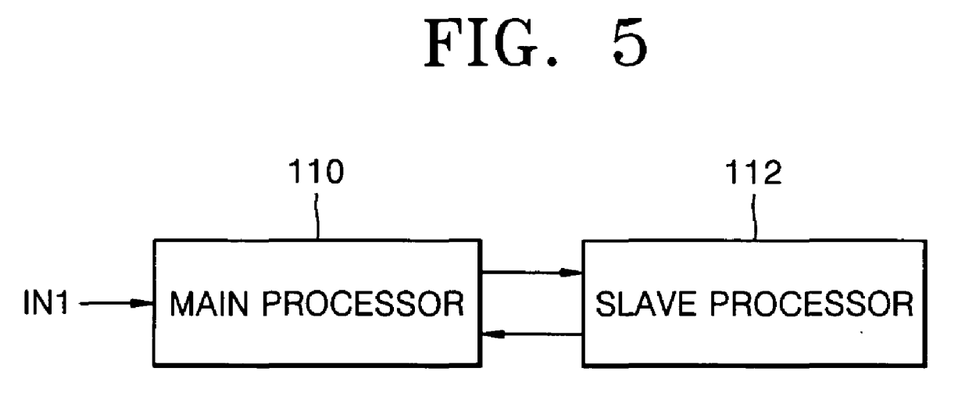
FIG. 5 is a block diagram schematically showing a data processing apparatus according to an embodiment of the present invention.

FIG. 5 is a block diagram schematically showing a data processing apparatus according to an aspect of the present invention, wherein the data processing apparatus has a main processor 110 and a slave processor 112.

The data processing apparatus shown in FIG. 5 performs the data processing method illustrated in FIG. 1. For example, the main processor 110 stores at least one reference address received through an input terminal IN1 and simultaneously transmits the reference address to the slave processor 112. The main processor 110 analyzes whether transmission data to be communicated with the slave processor 112 is type 1 data or type 2 data and sets a relative address according to the analyzed result. Then, the main processor 110 transmits the relative address to the slave processor 112 and processes type 1 data and/or type 2 data, wherein the relative address is an address of the slave processor 112 in which the transmission data is to be stored or an address of the slave processor 112 in which the transmission data to be received from the slave processor 112 is stored in FIG. 1 operation 10.

Next, the slave processor 112 stores at least one reference address received from the main processor 110, compares the relative address received from the main processor 110 with the reference address received from the main processor 110, and determines whether the transmission data is type 1 data or type 2 data. Then, the slave processor 112 corrects errors generated during the processing of the transmission data, using predetermined processes according to the type of data. When errors are corrected, the slave processor stores or reads type 1 and type 2 data. For example, the slave processor 112 reads transmission data from among stored data requested by the main processor 110, through the relative address of the transmission data, and transmits the read transmission data to the main processor 110. Or, the slave processor 112 stores the transmission data received from the main processor 110 in the relative address received from the main processor 110.

For convenience of description, an embodiment of the slave processor 112 will be described prior to describing an embodiment of the main processor 110.

Figure 6:
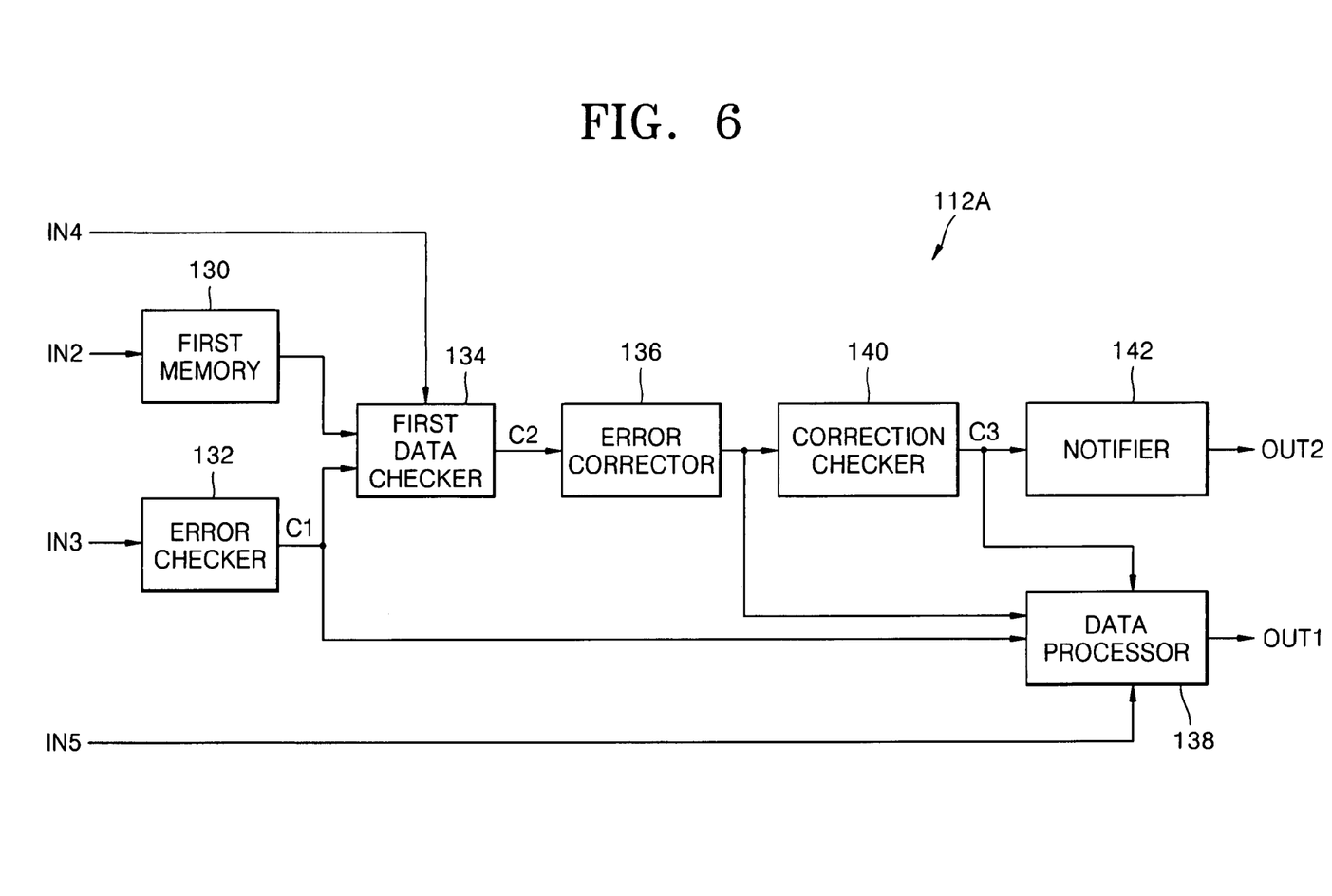
FIG. 6 is a block diagram showing an embodiment of a slave processor shown in FIG. 5.

FIG. 6 is a block diagram showing an embodiment 112A of the slave processor 112 shown in FIG. 5, according to an aspect of the present invention. Here, the slave processor 112A includes a first memory 130, an error checker 132, a first data checker 134, an error corrector 136, a data processor 138, a correction checker 140, and a notifier 142.

The slave processor 112A shown in FIG. 6 performs the method illustrated in FIG. 3.

As in FIG. 3 operation 50, the first memory 130 stores at least one reference address received from the main processor 110 through an input terminal IN2. When a relative address transmitted from the main processor 110 is input through an input terminal IN3, the error checker 132 checks whether errors are generated, and outputs the checked result as a first control signal C1 to the first data checker 134 and the data processor 138, respectively as illustrated in FIG. 3 operation 52.

The first data checker 134 compares the relative address received from the main processor 110 through an input terminal IN4 with the reference address received from the first memory 130, in response to the first control signal C1 received from the error checker 132, and outputs the compared result as a second control signal C2 to the error corrector 136, wherein the compared result indicates whether the transmission data is type 1 data or type 2 data as illustrated in FIG. 3 operation 54. For example, if it is recognized through the first control signal C1 that an error is generated, the first data checker 134 determines whether the transmission data is type 1 data or type 2 data. The first data checker 134 receives the reference address from the first memory 130, as shown in FIG. 6, or receives the reference address directly from the main processor 110 through the input terminal IN2 not shown in FIG. 6.

To perform operations 56 and 58, the error corrector 136 corrects errors using the first or the second process, in response to the second control signal C2 received from the first data checker 134, and outputs the corrected result. For example, if the second control signal C2 indicates that the transmission data is type 1 data, the error corrector 136 corrects the error using the first process as illustrated in FIG. 3 operation 56. Alternatively, if the second control signal C2 indicates that the transmission data is type 2 data, the error corrector 136 corrects the error using the second process as illustrated in FIG. 3 operation 58.

The data processor 138 receives and stores the transmission data transmitted from the main processor 110 through an input terminal IN5, in response to the first control signal C1 received from the error checker 132, or transmits the stored transmission data to the main processor 110 through an output terminal OUT1. For example, if it is recognized through the first control signal C1 that no errors were generated, the data processor 138 receives or transmits data as illustrated by FIG. 3 operation 64.

An alternative embodiment to 12A shown in FIG. 3 can omit operations 60 and 62, and instead, operation 64 is performed after operation 56 or 58. In such case, the data processor 138 receives and stores the transmission data transmitted from the main processor 110 through the input terminal IN5, or transmits the stored transmission data to the main processor 110 through the output terminal OUT1, in response to the error-corrected result received from the error corrector 136. For example, if the error-corrected result received from the error corrector 136 indicates that the error-correction operation is complete, the data processor 138 receives or transmits data as illustrated by FIG. 3 operation 64.

However, in the aspect shown in embodiment 12A, the correction checker 140 determines if errors are present in the error-corrected result received from the error checker 136 as illustrated in FIG. 3 operation 60, and outputs the checked result as a third control signal C3 to the notifier 142 and data processor 138. The notifier 142 notifies the main processor 110 of the presence of an error-corrected result through the output terminal OUT2, in response to the third control signal C3 received from the correction checker 140 as illustrated in FIG. 3 operation 62. For example, if it is recognized through the third control signal C3 that an error is present in the error-corrected result, the notification unit 142 notifies the main processor 110 of the existence of an error, that is, that the error is not corrected completely. The data processor 138 receives and stores transmission data transmitted from the main processor 110 through the input terminal IN5, or transmits stored transmission data to the main processor 110 through the output terminal OUT1, in response to the third control signal C3 received from the correction checker 140 as illustrated in FIG. 3 operation 64. For example, if the third control signal C3 indicates that no errors exist in the error-corrected result, the data processor 138 transmits the transmission data to the main processor 110 or receives the transmission data from the main processor 110.

Figure 7:
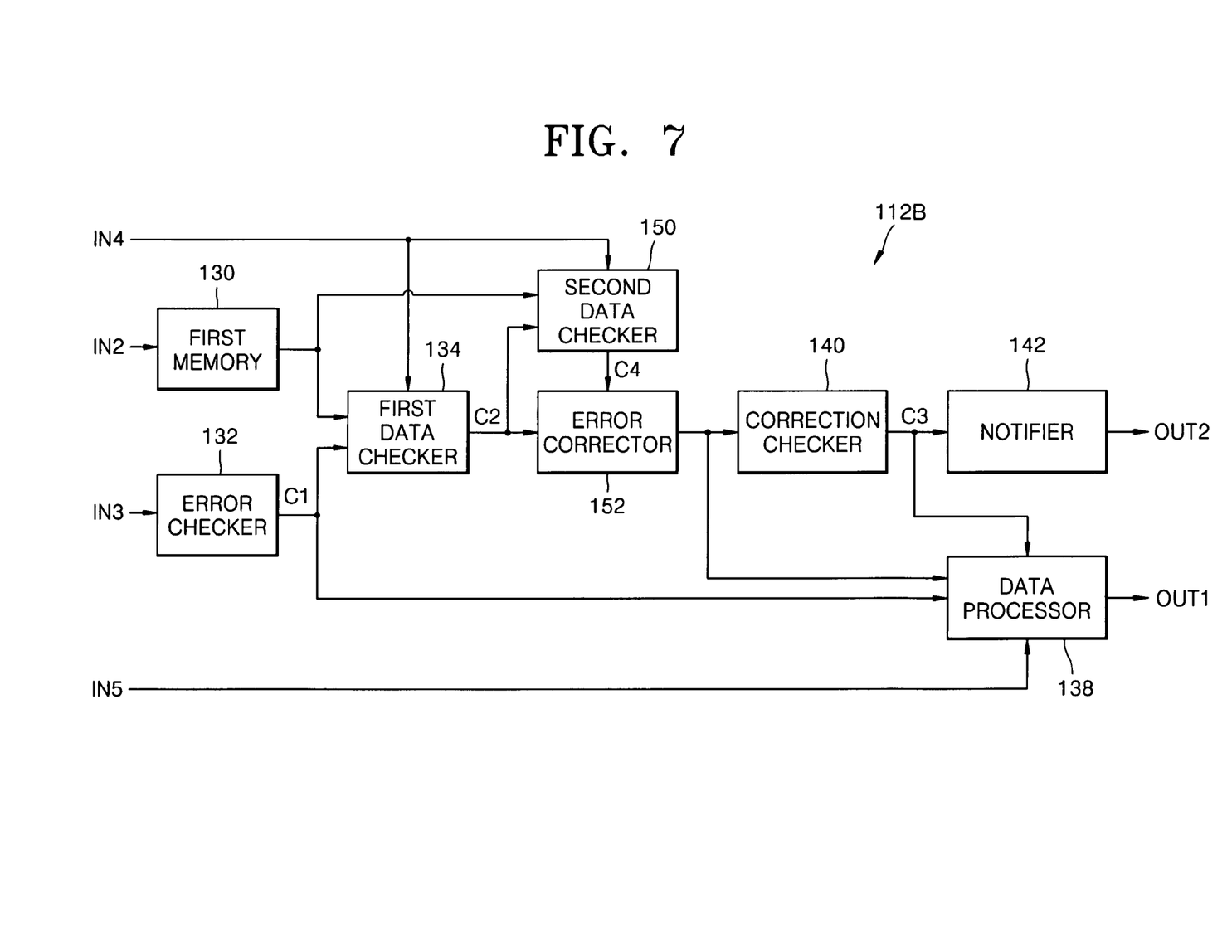
FIG. 7 is a block diagram showing an alternate embodiment of the slave processor shown in FIG. 5.

FIG. 7 is a block diagram showing the alternate embodiment 112B of the slave processor 112 shown in FIG. 5, according to an aspect of the present invention. The slave processor 112B comprises a first memory 130, an error checker 132, a first data checker 134, a second data checker 150, an error checker 152, a correction checker 140, a notifier 142, and a data processor 138.

The slave processor 112B shown in FIG. 7 performs the method illustrated in FIG. 4.

Since the first memory 130, the error checker 132, the first data checker 134, the correction checker 140, the notifier 142, and the data processor 138 shown in FIG. 7, which perform operations 80, 82, 84, 94, 96, and 98 illustrated in FIG. 4, respectively, perform the same operations as the first memory 130, the error checker 132, the first data checker 134, the correction checker 140, the notifier 142, and the data processor 138 shown in FIG. 6, respectively, the detailed descriptions thereof are omitted.

The second data checker 150 determines whether type 2 data is non-decisive data or decisive data, using a relative address received through an input terminal IN4 and a reference address received from the first memory 130, in response to the second control signal C2 received from the first data checker 134. Then, the second data checker 150 outputs the result as a fourth control signal C4 to the error corrector 152. For example, if the second control signal C2 indicates that the transmission data is type 2 data, the second data checker 150 determines whether the type 2 data is decisive data or non-decisive data. The second data checker 150 receives the reference address from the first memory 130, as shown in FIG. 7. In another aspect of the present invention, the second data checker receives the reference address directly through the input terminal IN2.

For example, as described above, the main processor 110 sets the relative address value larger than the first reference address value if the transmission data is type 1 data. On the other hand, if the transmission data is type 2 data, the main processor 110 sets the relative address value smaller than the first reference address value, and larger or smaller than the second reference address value, according to whether the type 2 data is decisive data or non-decisive data. In this case, the first data checker 134 compares the relative address with the first reference address, in response to the first control signal C1, and outputs the compared result as the second control signal C2, wherein the compared result indicates that the transmission data is type 1 data or type 2 data. At this time, the second data checker 150 compares the relative address received through the input terminal IN4 with the second reference address received from the first memory 130, in response to the second control signal C2, and outputs the compared result as a fourth control signal C4 to the error corrector 152, wherein the compared result indicates that the type 2 data is non-decisive data or decisive data.

As illustrated in FIG. 4 operations 86, 90, and 92, the error corrector 152 corrects errors using a first process, a second process, or a third process, in response to the second control signal C2 received from the first data checker 134 and the fourth control signal C4 received from the second data checker 150. The error corrector 152 then outputs the corrected result to the correction checker 154. For example, if the second control signal C2 indicates that the transmission data is type 1 data, the error corrector 152 corrects errors using the first process, as illustrated in FIG. 4 operation 86. On the other hand, if the second control signal C2 input from the first data checker 134 indicates that the transmission data is type 2 data and the fourth control signal C4 received from the second data checker 150 indicates that the type 2 data is non-decisive data, the error corrector 152 corrects errors using the second process, as illustrated in FIG. 4 operation 90. However, if the second control signal C2 received from the first data checker 134 indicates that the transmission data is type 2 data and the fourth control signal C4 received from the second data checker 150 indicates that the type 2 data is decisive data, the error corrector 152 corrects the error using a third process, as illustrated in FIG. 4 operation 92.

Figure 8:
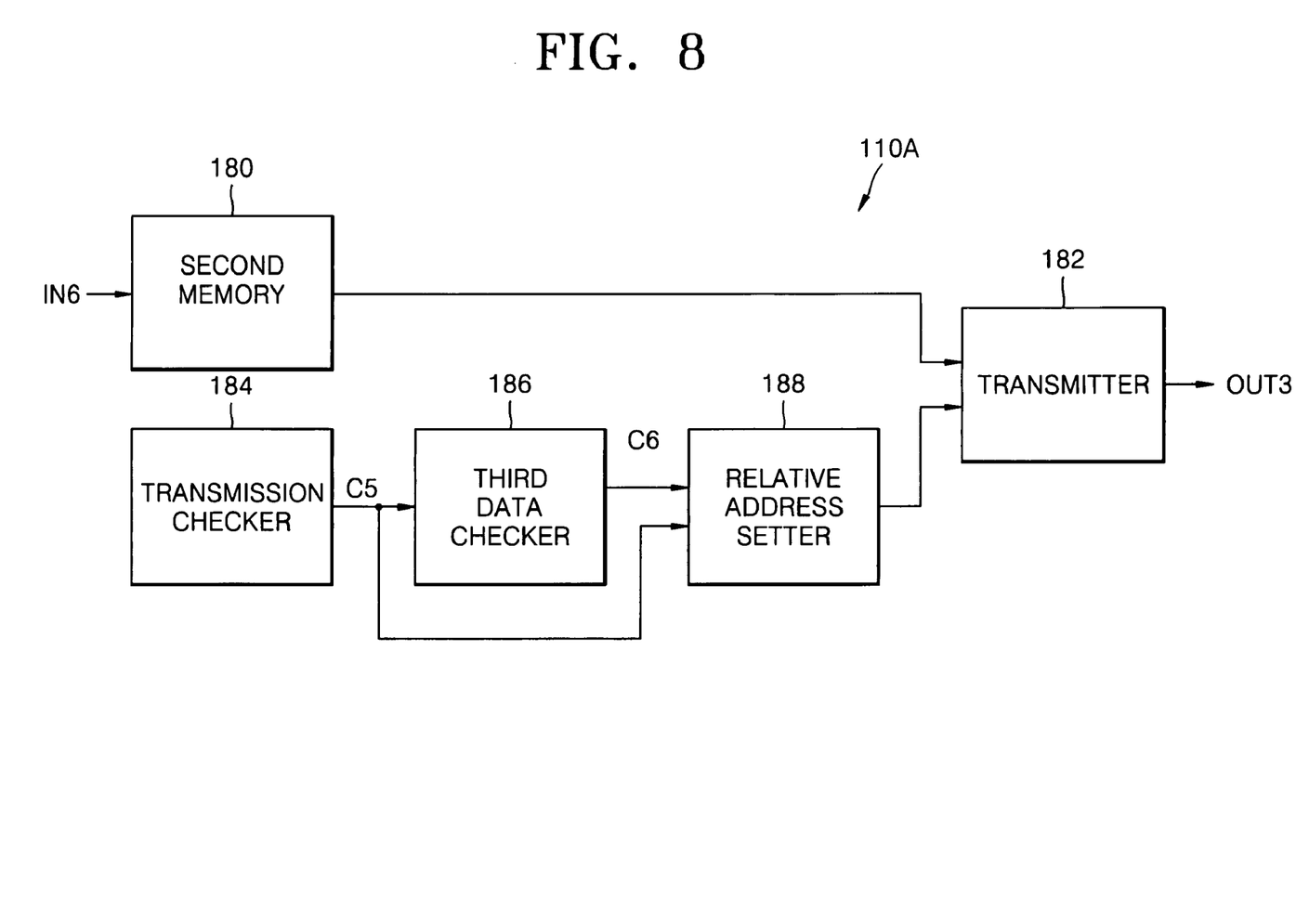
FIG. 8 is a block diagram showing an embodiment of a main processor shown in FIG. 5.

FIG. 8 is a block diagram showing an embodiment 110A of the main processor 110 shown in FIG. 5, according to an aspect of the present invention, wherein the main processor 110A comprises a second memory 180, a transmitter 182, a transmission checker 184, a third data checker 186, and a relative address setter 188.

The main processor 110A shown in FIG. 8 is to perform the operation illustrated in FIG. 2 operation 10A. The second memory 180 stores at least one reference address received through an input terminal IN6 as illustrated in FIG. 2 operation 20.

As illustrated in FIG. 2 operation 22, the transmitter 182 transmits at least one reference address read from the second memory 180 to the slave processor 112 through the output terminal OUT3. The transmitter 182 receives at least one reference address to be transmitted to the slave processor 112 from the second memory 180, as shown in FIG. 8. In an alternate embodiment of the present invention, the transmitter 182 receives the reference address directly through the input terminal IN6.

As illustrated in FIG. 2 operation 24, the transmission checker 184 checks whether the transmission data is to be transmitted to the slave processor 112 or received from the slave processor 112, and outputs the checked result as a fifth control signal C5 to the third data checker 186 and to the relative address setter 188.

As illustrated in FIG. 2 operation 26, the third data checker 186 determines whether the transmission data is type 1 data or type 2 data in response to the fifth control signal C5 received from the transmission checker 184, and outputs the result as a sixth control signal C6 to the relative address setting unit 188. For example, if the fifth control signal C5 indicates that the transmission data is to be transmitted to the slave processor 112, the third data checker 186 checks whether the transmission data is type 1 data or type 2 data.

The main processor 110A shown in FIG. 8 includes the relative address setter 188 and the transmitter 182. The relative address setter 188 sets a relative address of the slave processor 112 in which the transmission data to be received from the slave processor 112 is stored or a relative address of the slave processor in which the transmission data to be transmitted to the slave processor 112 is to be stored, in response to the fifth control signal C5 received from the transmission checker 184 and the sixth control signal C6 received from the third data checker 186. The relative address setter 188 then outputs the set relative address to the transmitter 182 as illustrated in FIG. 2 operations 28, 30, and 32.

For example, if the fifth control signal C5 indicates that the transmission data is to be transmitted to the slave processor 112 and the sixth control signal C6 indicates that the transmission data is type 1 data, the relative address setter 188 sets the relative address value larger than the reference address value. And if the fifth control signal C5 indicates that the transmission data is to be transmitted to the slave processor 112, and the sixth control signal C6 indicates that the transmission data is type 2 data, the relative address setter 188 sets the relative address value smaller than the reference address value. Also, if the fifth control signal C5 indicates that the transmission data is to be transmitted to the slave processor 112 and the sixth control signal C6 indicates that the transmission data is type 1 data, the relative address setter 188 sets the relative address value smaller than the reference address value. If the fifth control signal C5 indicates that the transmission data is to be transmitted to the slave processor 112 and the sixth control signal C6 indicates that the transmission data is type 2 data, the relative address setter 188 sets the relative address value larger than the reference address value. However, if the fifth control signal C5 indicates that the transmission data is to be received from the slave processor 112, the relative address setter 188 sets a relative address of the slave processor 112 in which the transmission data to be received from the slave processor 112 is stored, and outputs the set relative address to the transmitter 182 as illustrated in FIG. 2 operation 32.

As illustrated in FIG. 2 operation 30, the transmitter 182 outputs the transmission data and the set relative address received from the relative address setter 188, to the slave processor 112 through the output terminal OUT3. The transmitter 182 then outputs the set relative address received from the relative address setter 188 to the slave processor 112 through the output terminal OUT3 as illustrated in FIG. 2 operation 32.

In the case that the main processor 110 corresponds to a host computer that cannot store data but can only process data, the slave processor 112 may be a hard disk drive acting as a memory of the host computer. In this case, the host computer 110 includes at least one reference address and relative address in a command and outputs the command to the hard disk drive 112. The hard disk drive 112 extracts the at least one reference address and relative address included in the command received from the host computer 110. At this time, the data processor 138 of the hard disk drive 112 transmits the transmission data to the host computer 110 through the output terminal OUT1, or receives and stores the transmission data transmitted from the host computer 110 through the input terminal IN5, according to the command received from the host computer 110.

As described above, in the method and apparatus of processing data according to data types various aspects of the present invention, it is possible to improve error-correction performance of a slave processor, by processing error-correction according to data type, that is, by correcting errors in one type data (type 1 data) in real-time and correcting errors in the other type data (type 2 data) as completely as possible. Also, according to the present invention, a user can utilize the slave processor for various purposes since the user can set or change at least one reference address. Further, it is possible to decease a maximum seek time and access time for which the main processor accesses the slave processor, by classifying data into the type 1 or type 2 data based on at least one reference address and storing them in the slave processor, in other words, by classifying and storing data according to its type.

The present invention may be embodied as a computer code, which can be read by a computer, on a computer readable recording medium. The computer readable recording medium includes all manner and types of recording apparatuses on which computer readable data are stored.

The computer readable recording media includes at least storage media such as magnetic storage media (e.g., ROM's, floppy disks, hard disks, etc.), optically readable media (e.g., CD-ROMs, DVDs, etc.), and carrier waves (e.g., transmissions over the Internet). Also, the computer readable recording media can be distributed to computer systems connected through a network and can be stored and executed as a computer readable code in a distributed mode.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of processing data according to data type, the method performed by a slave processor and a main processor, wherein the slave processor stores and/or reads transmission data that is either type 1 data that has to be processed in real-time or type 2 data that does not have to be processed in real-time, and the main processor is connected to the slave processor to process at least one among the type 1 data and the type 2 data, the data processing method comprising:

the main processor:
transmitting at least one reference address to the slave processor;
storing the reference address to the slave processor;
analyzing whether transmission data to be communicated to the slave processor is the type 1 data or the type 2 data;
setting a relative address according to the analyzed result; and
transmitting the relative address to the slave processor, wherein the relative address is an address of the slave processor in which the transmission data to be transmitted to the slave processor is to be stored, or an address of the slave processor in which the transmission data to be received from the slave processor is stored; and the slave processor:
storing the transmitted reference address;
determining whether the transmission data is the type 1 data or the type 2 data by comparing the relative address with the reference address; and
correcting errors generated when the transmission data is processed, using predetermined processes according to the determined data type.

2. The data processing method of claim 1, wherein the reference address or addresses are set by a user.

3. The data processing method of claim 1, wherein the type 1 data is audio data or audio-visual data.

4. The data processing method of claim 1, wherein the relative address is a logical block address.

5. The data processing method of claim 1, wherein the analyzing the type of the transmission data to be communicated to the slave processor comprises:
determining whether the transmission data is to be transmitted to the slave processor or received from the slave processor, wherein;
if the transmission data is to be transmitted to the slave processor,
determining whether the transmission data is the type 1 data or the type 2 data,
setting the relative address according to the determined result, and
transmitting the set relative address and the transmission data to the slave processor; and
if the transmission data is to be received from the slave processor, transmitting the relative address of the slave processor in which the transmission data to be received from the slave processor is stored to the slave processor.

6. The data processing method of claim 5, wherein the determining whether the transmission data is the type 1 data or the type 2 data comprises analyzing a header of the transmission data.

7. The data processing method of claim 1, wherein the correcting of the errors generated when the transmission data is processed comprises:
   determining if any errors are generated when the relative address is received from the main processor;
   correcting the error or errors using a first process if the transmission data is the type 1 data; and
   correcting the error or errors using a second process if the transmission data is the type 2 data, wherein the second process is different from the first process.

8. The data processing method of claim 7, wherein the determining if the data is the type 1 data or the type 2 data comprises determining in the slave processor whether a relative address value received from the main processor is larger than a reference address value.

9. The data processing method of claim 8, wherein the correcting of the errors generated when the transmission data is processed comprises:
   setting the relative address value larger than the reference address value if the transmission data is the type 1 data, and setting the relative address value smaller than the reference address value if the transmission data is the type 2 data;
   correcting the error or errors using the first process if the relative address value is larger than the reference address value; and
   correcting the error or errors using the second process if the relative address value is smaller than the reference address value.

10. The data processing method of claim 8, wherein the correcting of the errors generated when the transmission data is processed comprises:
    setting the relative address value smaller than the reference address value if the transmission data is the type 1 data, and setting the relative address value larger than the reference address value if the transmission data is the type 2 data;
    correcting the error or errors using the first process if the relative address value is smaller than the reference address value; and
    correcting the error or errors using the second process if the relative address value is larger than the reference address value.

11. The data processing method of claim 7, further comprising, determining whether an error exists in the error-corrected result, and notifying the main processor if the error exists in the error corrected result.

12. The data processing method of claim 7, wherein the transmission data is the type 2 data, the data processing method further comprising:
    determining whether the type 2 data is non-decisive data or decisive data;
    correcting the error or errors using the second process if the type 2 data is non-decisive data; and
    correcting the error using a third process if the type 2 data is decisive data, wherein the third process is different from the second process.

13. The data processing method of claim 7, wherein the method further comprises:
    comparing the relative address with a first reference address in the slave processor to determine whether the transmission data is the type 1 data or the type 2 data;
    if the transmission data is the type 2 data, the slave processor comparing the relative address with a second reference address and determining whether the type 2 data is non-decisive data or decisive data; and
    the main processor setting the relative address using the first reference address if the transmission data is type 1 data and setting the relative address using the first and second reference addresses if the transmission data is type 2 data.

14. The data processing method of claim 12, wherein the decisive data is log data.

15. An apparatus for processing data according to data type, comprising:
    a slave processor which:
        receives and stores at least one reference address,
        receives a relative address,
        determines whether transmission data is the type 1 data or the type 2 data by comparing the relative address with the reference address,
        corrects errors generated when the transmission data is processed, using processes differently predetermined according to the determined result, and
        stores or reads the transmission data; and
    a main processor, wherein the main processor;
        transmits and stores the reference address or addresses to the slave processor,
        analyzes whether the transmission data to be communicated with the slave processor is the type 1 data or the type 2 data,
        sets the relative address according to the analyzed result,
        transmits the set relative address to the slave processor, wherein the relative address is an address of the slave processor in which the transmission data is to be stored or an address of the slave processor in which the transmission address to be received from the slave processor is stored, and
        processes the transmission data, wherein the type 1 data has to be processed in real-time and the type 2 data does not have to be processed in real-time.

16. The data processing apparatus of claim 15, wherein the relative address is a logical block address.

17. The data processing apparatus of claim 15, wherein the slave processor comprises:
    a first memory to store the reference address or addresses received from the main processor;
    an error checker to check whether an error is generated, in response to the relative address received from the main processor, and output the checked result as a first control signal;
    a first data checker to compare the relative address with the reference address, in response to the first control signal, and output the compared result as a second control signal, the compared result indicating whether the transmission data is the type 1 data or the type 2 data;
    an error corrector to correct errors using a first process or a second process wherein the second process is different from the first process, in response to the second control signal, and output the corrected result; and
    a data processor to store the transmission data received from the main processor, in response to the first control signal, or transmit the stored transmission data to the main processor.

18. The data processing apparatus of claim 17, wherein the slave processor further comprises:
a second data checker to determine whether the data, determined to be type 2 data, is non-decisive data or decisive data, in response to the second control signal, and output the determined result as a fourth control signal, wherein the error corrector corrects errors using the first process, the second process, or a third process, the third process being different from the second process, in response to the second and fourth control signals, and outputs the corrected result.

19. The data processing apparatus of claim 17, wherein the slave processor further comprises:
a second data checker to determine whether the data, determined to be the type 2 data, is non-decisive data or decisive data, in response to a manually input control signal, and output the determined result as a fourth control signal, wherein the error corrector corrects errors using the first process, the second process, or a third process, the third process being different from the second process, in response to the second and fourth control signals, and outputs the corrected result.

20. The data processing apparatus of claim 17, wherein the slave processor further comprises:
a correction checker to check whether an error exists in the corrected result received from the error corrector, and output the checked result as a third control signal; and
a notifier to notify the main processor of the existence of an error or errors, in response to the third control signal, wherein the data processor stores the transmission data received from the main processor or transmits the stored transmission data to the main processor, in response to the first or the third control signal.

21. The data processing apparatus of claim 18, wherein:
the slave processor receives and stores a plurality of reference addresses, the plurality of reference addresses comprising a first reference address and a second reference address;
the first data checker compares the relative address with the first reference address in response to the first control signal, and outputs the compared result as the second control signal, the compared result indicating whether the transmission data is the type I data or the type 2 data,
if the transmission data is determined to be the type 2 data, the second data checker compares the relative address with the second reference address, in response to the second control signal, and outputs the compared result as a fourth control signal, the compared result indicating whether the data is non-decisive data or decisive data, and
the main processor sets the relative address using the first reference address if the transmission data is the type 1 data, and sets the relative address using the second reference address if the transmission data is the type 2 data.

22. The data processing apparatus of claim 15, wherein the main processor comprises:
a second memory to store the reference address or addresses;
a transmission checker to check whether the transmission data is to be transmitted to the slave processor and output the checked result as a fifth control signal;
a third data checker to determine whether the transmission data is the type 1 data or the type 2 data, in response to the fifth control signal, and output the determined result as a sixth control signal;
a relative address setter to set a relative address of the slave processor in which the transmission data to be received from the slave processor is stored or a relative address of the slave processor in which the transmission data to be transmitted to the slave processor is to be stored, in response to the fifth and sixth control signals, and outputs the set relative address; and
a transmitter to transmit the reference address, the relative address, and the transmission data to the slave processor.

23. The data processing apparatus of claim 17, wherein the main processor sets a relative address value larger than a reference address value if the transmission data is the type 1 data, and sets the relative address value not larger than the reference address value if the transmission data is the type 2 data.

24. A computer readable storage medium storing computer readable code that controls at least one processor to implement a method for processing data according to data type, wherein the method comprises:
receiving transmission data, wherein the transmission data is either type 1 data which has to be processed in real time, or type 2 data which does not have to be processed in real time;
determining whether the transmission data is the type 1 data or the type 2 data;
processing the transmission data;
detecting if errors were generated during the processing of the transmission data; and
correcting the errors generated during the processing of the transmission data using a first error correction process if the transmission data is the type 1 data and using a second error correction process if the transmission data is the type 2 data.

25. The computer readable storage medium of claim 24, wherein the type 1 data is audio data.

26. A computer readable storage medium storing computer readable code for implementing the method of claim 1.

* * * * *

UNITED STATES PATENT AND TRADEMARK OFFICE
CERTIFICATE OF CORRECTION

PATENT NO. : 7,228,454 B2  Page 1 of 1
APPLICATION NO. : 10/790782
DATED : June 5, 2007
INVENTOR(S) : Sung-Youn Cho et al.

It is certified that error appears in the above-identified patent and that said Letters Patent is hereby corrected as shown below:

Column 15, Line 44, change "I" to --1--.

Column 16, Line 31, after "readable" delete "storage".

Signed and Sealed this

Thirtieth Day of October, 2007

JON W. DUDAS
*Director of the United States Patent and Trademark Office*